(12) United States Patent
Pulkkinen et al.

(10) Patent No.: US 8,145,792 B2
(45) Date of Patent: Mar. 27, 2012

(54) METHOD FOR DIRECTING DATA TO A USER APPLICATION AND RELATED TERMINAL AND SYSTEM

(75) Inventors: Riku Pulkkinen, Tampere (FI); Vesa Hametvaara, Tampere (FI); Matti Pärnänen, Tampere (FI)

(73) Assignee: Nokia Corporation, Espoo (FI)

( * ) Notice: Subject to any disclaimer, the term of this patent is extended or adjusted under 35 U.S.C. 154(b) by 2202 days.

(21) Appl. No.: 10/462,212

(22) Filed: Jun. 13, 2003

(65) Prior Publication Data

US 2004/0030988 A1 Feb. 12, 2004

(30) Foreign Application Priority Data

Jun. 14, 2002 (FI) .................................... 20021163

(51) Int. Cl.
*G06F 15/16* (2006.01)
*G06F 9/44* (2006.01)

(52) U.S. Cl. ........ 709/246; 709/200; 709/203; 717/168; 717/171

(58) Field of Classification Search .................... 463/41, 463/37, 29, 36; 273/138; 709/201–203, 709/220–226, 200, 206, 246; 717/168–178
See application file for complete search history.

(56) References Cited

U.S. PATENT DOCUMENTS

| | | | | |
|---|---|---|---|---|
| 5,995,756 A * | 11/1999 | Herrmann | ................... | 717/178 |
| 6,546,554 B1 * | 4/2003 | Schmidt et al. | ............... | 717/176 |
| 7,076,730 B1 * | 7/2006 | Baker | .......................... | 715/210 |
| 7,275,243 B2 * | 9/2007 | Gibbons et al. | ............... | 717/159 |
| 7,386,858 B1 * | 6/2008 | Peacock et al. | ............... | 719/314 |
| 2002/0029265 A1 * | 3/2002 | Mizoguchi | .................... | 709/223 |
| 2002/0115456 A1 * | 8/2002 | Narinen et al. | ................ | 455/466 |
| 2002/0116575 A1 * | 8/2002 | Toyomura et al. | ............ | 711/115 |
| 2002/0183045 A1 * | 12/2002 | Emmerson et al. | ........... | 455/412 |
| 2002/0188736 A1 * | 12/2002 | Jarvensivu | .................... | 709/229 |
| 2003/0144022 A1 * | 7/2003 | Hatch | ........................... | 455/550 |
| 2003/0145317 A1 * | 7/2003 | Chamberlain | ................ | 717/177 |
| 2003/0220097 A1 * | 11/2003 | Aono et al. | .................... | 455/410 |
| 2004/0267912 A1 * | 12/2004 | Kim | .............................. | 709/220 |
| 2005/0010647 A1 * | 1/2005 | Durham | ........................ | 709/212 |
| 2005/0010927 A1 * | 1/2005 | Stern et al. | .................... | 719/310 |
| 2005/0021818 A1 * | 1/2005 | Singhal et al. | ................ | 709/232 |
| 2005/0149572 A1 * | 7/2005 | Kanai et al. | ................ | 707/104.1 |

FOREIGN PATENT DOCUMENTS

EP 1246428 10/2002
EP 1246428 A2 * 10/2002

* cited by examiner

*Primary Examiner* — Joshua Joo
(74) *Attorney, Agent, or Firm* — Ditthavong Mori & Steiner, P.C.

(57) ABSTRACT

A method, a system and a terminal for processing data, wherein the data is transmitted from the external memory device being part of a system, to the terminal, wherein the data content is recognized by means of the new field added to the application area data file and basing on that, directed to an application area specific handler, where a new media type is generated by concatenating a identification of the data to a public and registered application area specific media type, and used to get the user application for the content and a directory where the content is saved to.

20 Claims, 3 Drawing Sheets

| Game ID | Data Type | Data Length | Size of Name String | Name String | Data ID | Data Version | NGDX header | [Data] |
|---|---|---|---|---|---|---|---|---|

Fig. 2

METHOD FOR DIRECTING DATA TO A USER APPLICATION AND RELATED TERMINAL AND SYSTEM

CROSS-REFERENCE TO RELATED APPLICATIONS

This application claims priority under 35 USC §119 to Finnish Patent Application No. 20021163 filed on Jun. 14, 2002.

FIELD OF THE INVENTION

This invention relates to a method for processing data in a system comprising a wireless terminal and an external memory device, and to a method for processing data in the wireless terminal. In said method additional data stored in the external memory device and registered with general type information is transmitted to the wireless terminal, where it is recognized and directed to an application handler and further to its own directory. In addition, this invention relates to a data processing system and to a wireless device being part of said system, said system comprising also an external memory device and said wireless device comprising means for recognizing and directing the data to the actual user application.

BACKGROUND OF THE INVENTION

Applications, e.g. games, in wireless communication devices have developed over the years so that it is possible to download additional content stored in an external memory through a communication network. Downloadable data file can comprise, for example in games, additional levels or new characters. In this description the term data refers to a content which can be downloaded from the network and be processed in the terminal and which is defined by a media type, preferably by MIME-type. Also this description is limited to the game data processing, but the processing method according to the invention is also adaptable to the other application areas.

It will be evident to the person skilled in the art, that additional data is mainly stored in the server or in another memory device outside of the wireless device, which reduces the load of the wireless device's memory. Being able to download the additional data to his own terminal, the user has to have a data transmission connection with said external memory device, which stores said data to be selected by the user and transmitted to his terminal. Game content will be saved into the memory of the terminal in binary format and the content-specific application performs needed functions for presenting the content data in its actual form to the user, for example on the display of the terminal.

In data transmission, the recognition of the data content is based on the MIME-type (Multipurpose Internet Mail Extensions). MIME-type describes the media type of the data transmitted through the communication network. Each new MIME-type must be registered in the Application Information File (AIF), which stores all the application-supported MIME-types and a priority value defined for each MIME-type. Priority value defines the application, which is primarily used by the data with the MIME-type in question. In some environments each MIME-type has its own recognizer for defining the content. Content recognition is needed for directing the data being attached to the actual application.

For the reason that each game is an independent application, the game data should be registered with its own MIME-type according to the prior art. Due to this, every application must provide MIME-type handling by itself. Because games are the most favorite applications in the wireless communication arena the registration and handling of each data content requires too much work by and memory capacity of the wireless device.

SUMMARY OF THE INVENTION

Main idea of this invention is to have one public MIME-type for all the data in the application area. When content with this media type, e.g. a game, is received, the recognizer defines the application area handling said media type and then content is transmitted to the application handler. Therefore the recognizer is independent of the data type and name. The application handler defines more accurately the application in question by extracting the identification part of the data. After this the handler copies the content of the file to the directory belonging to the application. Content is this way definable by means of one common recognizer and one common handler, which saves the memory of the phone. In addition, the slow registration of the MIME-types and MIME-supported recognizers is not needed because it is adequate for having one author to control the correspondence between ID-numbers and data files. Public MIME-typing creates well-defined frames for the future applications. Data format is shared between different communication devices, which enables compatibility between different devices and applications.

DESCRIPTION OF THE DRAWINGS

Directing method according to this invention and concentrating on game data, is more closely described next with the help of figures, where.

DETAILED DESCRIPTION OF THE INVENTION

Figure 1:
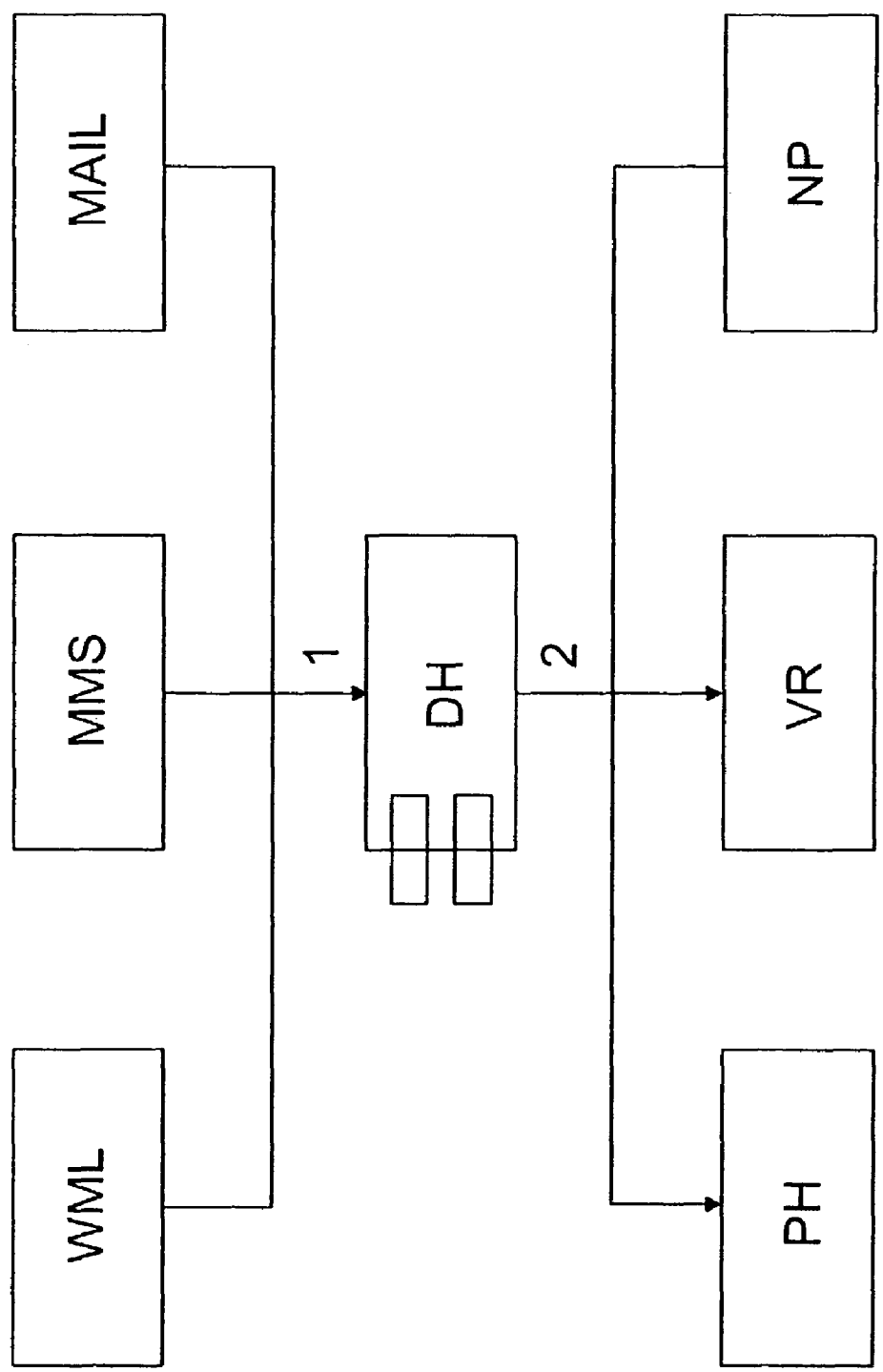
FIG. 1 illustrates the action of the document handler in simplified form, FIG. 2 describes the form of the game data according to invention.

The action of the document handler DH, is illustrated very generally in the FIG. 1. References to the functions in the FIG. 1 are presented in the text by numbers in parentheses.

In general, the document handler DH, is a utility to direct and to save content to an actual application based on a MIME-type and also to launch the application if needed. Document handler DH receives (1) for example in a WML-browser the content originated from data WML, multimedia messages MMS, mail attachments MAIL or data received through Infrared or Bluetooth. After this content is directed to and stored (2) in the application data directory. Downloaded content is performed in the actual application, e.g. photo album PH, recorder VR or notepad NP, launched during the storing. Downloaded content can also only be stored in the application directory, from where the application (game etc) detects it and picks it for use.

In detail, document handler DH uses through an interface application-specific handlers specialized for particular MIME-types i.e., by means of document handler DH the complex architecture of the process of content handling is hid. It can be mentioned, that document handler DH depends heavily on standard MIME-type recognition because finding the content-specific handler for each data is based on the MIME-types. Document handler DH provides an interface for storing the content into a directory of an actual application in its own form. Document handler DH takes care of necessary tasks occurring in the storage: finding the correct place for saving a file, offering a simple function for saving and naming unnamed buffers. The document handler DH is capable of storing data to the correct place, if the application developer has declared the game directory with the register SDC. The role of register SDC is to store key-value-pairs behind the common interface SD that for example the key application/x-NokiaGameData-<10189> provides an application and directory of the game 10189.

In FIG. 2 the game data file structure is presented. GameID is a unique number identifying each game. Data Type distinguishes the levels, the weapons, the characters etc for the game. Data length defines the size of the following field as 32-bit number. Size of the Name String-field defines the size of the name field in Unicode characters. Name String is the Unicode string, which is a name of the game in textual format and is seen for example in game menu. Data ID-field illustrates the unique 32-bit number identifying the data content. Data version is a number for allowing the compatibility checking by the game. Typical use is to use different versions for different size displays. NGDX Header acts as identification for the game data. Recognition according to invention is based on this field.

Figure 3:
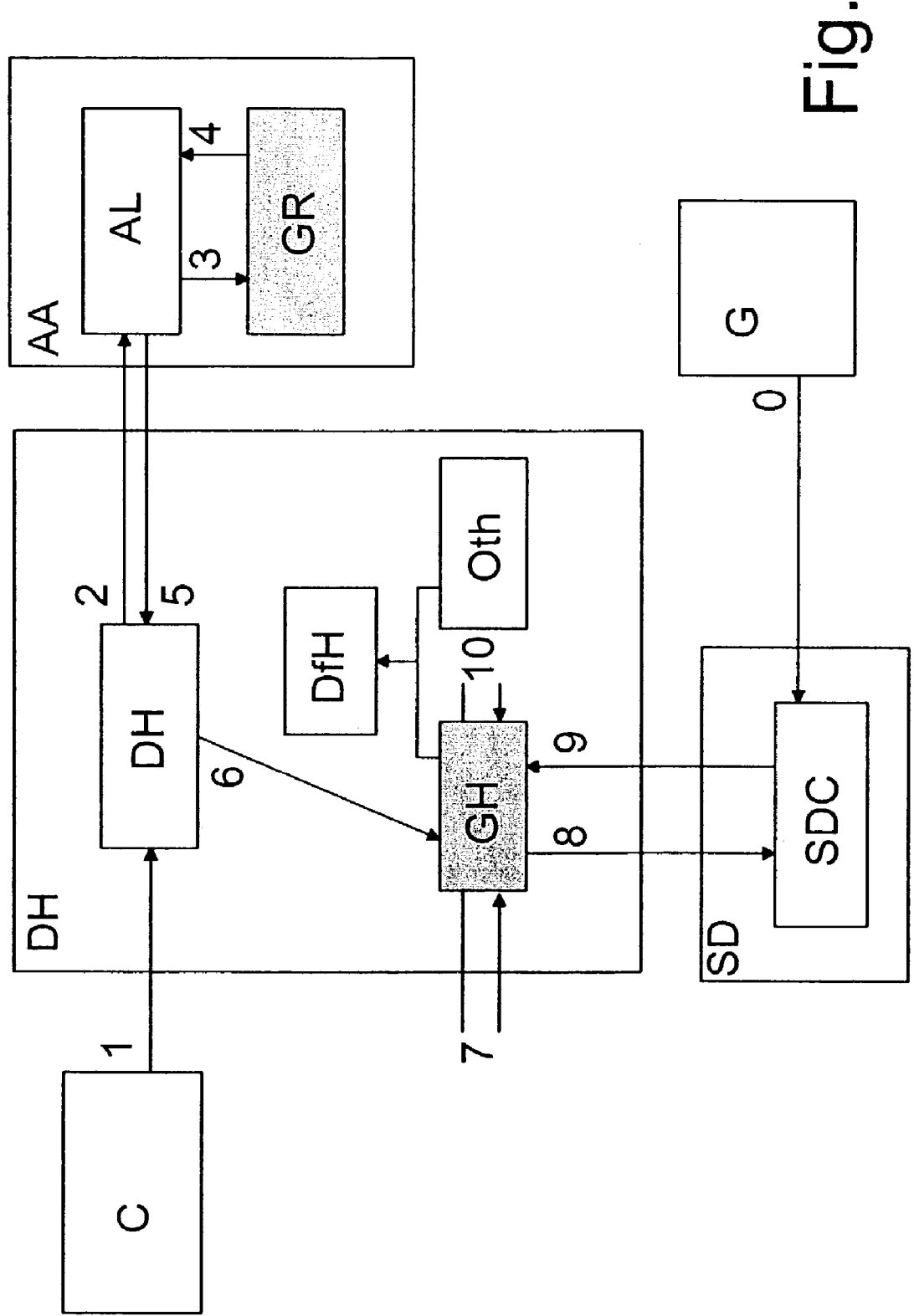
FIG. 3 illustrates the game data processing according to invention.

FIG. 3 illustrates how the game data file is directed to the directory of the application according to the invention. When game G is installed to the communication device it should be registered with a MIME-type, which is unique for each game (and other applications). MIME-type is formed as application/x-NokiaGameData-<GameID> (GameID in FIG. 2). During the installation the game registers its directories into the application register SDC. Registration 0 is made substantially only once.

Game data file is downloaded from the client application C in the server to be used by the game application. During the installation the game data file has registered the MIME-type, which is uniform between different games and different contents. Without said public MIME-type, in this point own recognizer for the data MIME-type should be registered for the terminal as well. Downloaded game data file is directed (1) to the document handler DH, which needs a description of the data content. This means, that the public MIME-type for games, application/x-NokiaGameData, should be recognized that the document handler DH can direct the content to the game handler GH. Document handler DH asks (2) the application architecture AA for the recognition. Application architecture AA comprises application classes AL, where recognizing class is comprised of different MIME-type recognizers. Game recognizer GR reacts (3) for the NGDX-field of the data file said NGDX-field locating only in the game data file. By this it is known that the downloaded file includes game content. This information is transmitted (4-5) to the document handler DH, which now can direct (6) it to the game handler GH. When the data is received the game is identified (7) by the game handler GH. The game handler GH gets the unique identification of the game, GameID, from the data file, which is then concatenated at the end of public MIME-type. Concatenated MIME-type, application/x-NokiaGameData-<GameID>, is used to find (8-9) the application and the directory through the interface SD. Downloaded game data is then stored (10) into the application directory and launched in the actual application. Default Handler DfH in the FIG. 3 receives the data, which is not agreeing with the common format, and performs the needed handling.

It should be evident that this invention is not limited only to the embodiment described above and it can be adapted within the relating claims.

The invention claimed is:

1. A method comprising
receiving data at a terminal, the data including a new media type specifying identification of an application of interest and a registered media type of a type of the application of interest, wherein the type of application is associated with a plurality of independent applications that include the application of interest;
extracting the identification from the new media type;
directing the data to a handler specific to the type of application and configured to process each of the independent applications; and
searching by the handler within the terminal, the application of interest and a directory for storing the data using the identification.

2. The method of claim 1, wherein the type of the application is associated with a plurality of independent game applications.

3. The method of claim 1, wherein the terminal is a mobile terminal capable of wireless communication.

4. The method of claim 1, wherein the new media type is a multipurpose internet mail extensions (MIME)-type.

5. The method of claim 1, further comprising:
determining the handler among a plurality of handlers, each of the plurality of handlers specific to a different type of application, based at least in part on the type of application,
wherein the identification of the application of interest is unique at least within the type of application.

6. The method of claim 1, wherein the directory is registered in the terminal in a form specific to the application of interest when the application of interest is installed.

7. A method comprising facilitating access to at least one interface to allow access to at least one service, the service configured to at least perform the following:
receiving data at an apparatus;
recognizing, among different types of applications, a type of an application of interest that processes the data, wherein each type of application is associated with a plurality of independent applications and a handler that is specific to the type of application and configured to process each of the independent applications;
generating a new media type specifying identification of the application of interest and a registered media type of the type of the application of interest;
including the new media type into the data; and
determining to transmit the data included with the new media type from the apparatus to a terminal.

8. The method of claim 7, wherein the data included with the new media type is transmitted via a wireless communication network.

9. The method of claim 7, wherein the type of the application of interest is associated with a plurality of independent game applications.

10. The method of claim 7, wherein the terminal is a mobile terminal capable of wireless communication, and the apparatus is a memory device, a server, or a data processing device capable of storing data.

11. The method of claim 7, the new media type is a multipurpose internet mail extensions (MIME)-type.

12. The method of claim 7, wherein the identification of the application of interest is unique at least within the type of the application.

13. An apparatus comprising:
a memory,
the apparatus being configured to perform at least the following:
receive data that includes a new media type specifying identification of an application of interest and a registered media type of a type of the application of interest, wherein the type of application is associated with a plurality of independent applications;
extract the identification from the new media type;
direct the data to a handler specific to the type of application and configured to process each of the independent applications; and search by the handler within the apparatus the application of interest and a directory for storing the data using the identification.

14. The apparatus of claim 13, wherein the type of the application is associated with a plurality of independent game applications.

15. The apparatus of claim 13, wherein the apparatus is a mobile wireless communication terminal.

16. The apparatus of claim 13, wherein the apparatus is further caused to:
determine the handler among a plurality of handlers, each of the plurality of handlers specific to a different type of application, based at least in part on the type of application,
wherein the identification of the application of interest is unique at least within the type of application.

17. An apparatus comprising
a memory, the apparatus configured to perform at least the following:
receive data;
recognize, among different types of applications, a type of an application of interest that processes the data, wherein each type of application is associated with a plurality of independent applications and a handler that is specific to the type of application and configured to process each of the independent applications;
generate a new media type specifying identification of the application of interest and a registered media type of the type of the application;
include the new media type into the data; and
determine to transmit the data included with the new media type to a terminal.

18. The apparatus of claim 17, wherein the data included with the new media type is transmitted via a wireless communication network.

19. The apparatus of claim 17, wherein the terminal is a mobile wireless communication terminal.

20. The apparatus of claim 17, wherein the apparatus is a memory device, a server, or a data processing device capable of storing data.

* * * * *